(12) United States Patent
Hoggarth et al.

(10) Patent No.: US 10,372,270 B2
(45) Date of Patent: Aug. 6, 2019

(54) ULTRASONIC HAPTIC CONTROL SYSTEM

(71) Applicant: Ford Global Technologies, LLC, Dearborn, MI (US)

(72) Inventors: Marcus Hoggarth, Hertfordshire (GB); Jasper Dekker, London (GB); Edward Rose, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/661,287

(22) Filed: Jul. 27, 2017

(65) Prior Publication Data
US 2018/0052541 A1 Feb. 22, 2018

(30) Foreign Application Priority Data

Aug. 17, 2016 (GB) .................................. 1614099.8

(51) Int. Cl.
*G06F 3/043* (2006.01)
*G06F 3/01* (2006.01)
(Continued)

(52) U.S. Cl.
CPC .............. *G06F 3/043* (2013.01); *B60K 35/00* (2013.01); *B60K 37/06* (2013.01); *G06F 3/016* (2013.01); *G06F 3/0488* (2013.01); *G06F 3/04815* (2013.01); *G06F 3/04845* (2013.01); *G06T 7/70* (2017.01); *B60K 2370/141* (2019.05); *B60K 2370/146* (2019.05); *B60K 2370/158* (2019.05); *B60K 2370/1531* (2019.05); *B60K 2370/1868* (2019.05); *B60K 2370/782* (2019.05);
(Continued)

(58) Field of Classification Search
CPC ...... G06F 3/043; G06F 3/016; G06F 3/04845; G06F 3/0488; G06F 3/04815; B60K 37/06; G06T 7/70; G06T 2207/30268; G06T 2207/10016; G06T 2207/30196
See application file for complete search history.

(56) References Cited

U.S. PATENT DOCUMENTS 6,714,327 B1 * 3/2004 Abersfelder ........... B60K 35/00
345/9
2007/0057781 A1 * 3/2007 Breed ..................... B60K 35/00
340/457.1
(Continued)

FOREIGN PATENT DOCUMENTS

JP 2016035645 A 3/2016
KR 102014007037 A 6/2014

*Primary Examiner* — Brent D Castiaux
(74) *Attorney, Agent, or Firm* — Vichit Chea; Price Heneveld LLP (57) ABSTRACT

An ultrasonic haptic control system for a motor vehicle is provided. The system includes a steering wheel assembly comprising a ring-shaped member configured to be held by an occupant of the vehicle, and rotated about a central axis in order to steer the vehicle; and a plurality of ultrasound emitters associated with the steering wheel. The ultrasound emitters are configured to focus ultrasound waves within a central region about which the ring-shaped member circumferentially extends and/or radially outside of and adjacent to the ring-shaped member. The focused ultrasound waves are configured to form one or more haptic control surfaces. A method of operating a haptic control system is also provided.

20 Claims, 7 Drawing Sheets

(51) Int. Cl.
*G06T 7/70* (2017.01)
*G06F 3/0481* (2013.01)
*G06F 3/0484* (2013.01)
*G06F 3/0488* (2013.01)
*B60K 37/06* (2006.01)
*B60K 35/00* (2006.01)

(52) U.S. Cl.
CPC ............. *G06T 2207/10016* (2013.01); *G06T 2207/30196* (2013.01); *G06T 2207/30268* (2013.01)

(56) References Cited

U.S. PATENT DOCUMENTS

| | | | |
|---|---|---|---|
| 2010/0302015 A1* | 12/2010 | Kipman | G06F 3/011 340/407.1 |
| 2013/0166146 A1* | 6/2013 | Tanaka | G06F 3/0488 701/36 |
| 2016/0185356 A1* | 6/2016 | Di Censo | B60W 50/0098 701/36 |

* cited by examiner

ULTRASONIC HAPTIC CONTROL SYSTEM

FIELD OF THE INVENTION

The present invention generally relates to a haptic control system for a motor vehicle, and more particularly relates to a haptic control system configured to reduce the number of controls presented to occupants of the vehicle.

BACKGROUND OF THE INVENTION

Motor vehicles often comprise a large number of controls that an occupant may wish to interact with while operating the vehicle. Many of the controls may be relevant to driving the vehicle, such as indicator controls and exterior light controls. However, other controls may be provided for accessory systems of the vehicle, such as entertainment systems, navigation systems and climate control systems.

It is often desirable to provide controls for vehicle systems that are within easy reach of a driving position, in order to allow the driver to use the controls without departing from the driving position. This may lead to a large number of controls being provided within a small area of the vehicle. In some cases, in order to provide all of the controls for each of the vehicle systems, it may be necessary for a single control surface to be used to provide control inputs to more than one system of the vehicle.

Providing a large number of controls may undesirably increase the complexity of operating the vehicle and may increase clutter around the driver, which may detract from the experience of driving the vehicle.

SUMMARY OF THE INVENTION

According to one aspect of the present disclosure, an ultrasonic haptic control system for a motor vehicle is provided. The system includes a steering wheel assembly comprising a ring-shaped member configured to be held by an occupant of the vehicle and rotated about a central axis to steer the vehicle; and a plurality of ultrasound emitters associated with the steering wheel, the ultrasound emitters configured to focus ultrasound waves within a central region about which the ring-shaped member circumferentially extends, e.g., within a void defined by the ring-shaped member, and/or radially outside of and adjacent to the ring-shaped member, the focused ultrasound waves being configured to form one or more haptic control surfaces.

The central axis of the steering wheel may pass through the central region. One or more of the ultrasound emitters may be provided in an array of ultrasound emitters. The array of ultrasound emitters may be provided on a trim portion of the vehicle, e.g., on a dashboard of the vehicle. The array of ultrasound emitters may be configured to project ultrasound towards the steering wheel. Additionally or alternatively to providing the ultrasound emitters on the trim portion of the vehicle, one or more of the ultrasound emitters may be provided on the ring-shaped member. For example, the ultrasound emitters may be circumferentially distributed around the ring-shaped member.

The ultrasound emitters may be distributed around an inner diameter of the ring-shaped member and configured to project sound into the void defined by the ring-shaped member. Additionally or alternatively, the ultrasound emitters may be distributed around an outer diameter of the ring-shaped member and configured to project sound into an area adjacent to the ring-shaped member.

The steering wheel may comprise a further ring-shaped member offset from the ring-shaped member along the central axis. One or more of the ultrasound emitters may be provided on the further ring-shaped member, e.g., distributed circumferentially around the further ring-shaped member.

The system may further comprise a camera, such as a 3D camera, configured to capture an image of a hand or fingers of the occupant. The system may be configured to determine a position of the occupant's hand or fingers relative to the ring-shaped member and/or locations at which the haptic control surfaces are formed or are to be formed. For example, by referring to the image captured by the camera.

The system may be configured to provide the haptic control surfaces when the occupant's hand or fingers are within a threshold distance of the locations at which the haptic control surfaces are formed or are to be formed. The system may be configured not to provide the haptic control surfaces when the occupant's hand or fingers are not within the threshold distance of the locations.

In some arrangements, when the occupant's hand or fingers are within the threshold distance of one or more of the locations, the haptic control system may provide corresponding haptic control surfaces at the one or more locations. The haptic control system may not provide one or more other haptic control surfaces that are formed in locations away from the occupant's hand or fingers, e.g., more than the threshold distance away from the occupant's hand or fingers.

The system may be configured to control the operation of the ultrasound emitters to control the position and/or haptic qualities of the haptic control surfaces according to the position of the occupant's hand or fingers, e.g., in order to give the impression that the occupant has manipulated the haptic control surface.

The system may be configured to determine a control input based on the position of the occupant's hand or fingers, e.g., relative to one or more of the haptic control surfaces. The system may send the control input to another controller of the vehicle, e.g., in order to be acted upon by a relevant system of the vehicle.

The steering wheel may be movable within the vehicle, e.g., translatable or rotatable about a further axis, such that the ring-shaped member central axis is movable between first and second positions. The haptic control system may be configured such that the haptic control surfaces remain stationary relative to the ring-shaped member central axis as the ring-shaped member moves.

The haptic control system may be configured such that one or more of the haptic control surfaces do not rotate as the ring-shaped member rotates about the central axis. For example, if the emitters are provided on a trim portion of the vehicle, the same emitters may be operated as the steering wheel rotates. Alternatively, if the ultrasound emitters are provided on the steering wheel, ultrasound emitters at different angular positions on the steering wheel may be operated as the steering wheel rotates.

Additionally or alternatively, the haptic control system may be configured such that one or more of the haptic control surfaces rotate together with the ring-shaped member as the ring-shaped member rotates about the central axis. For example, if the emitters are provided on a trim portion of the vehicle, the haptic control system may rotate through the emitters, e.g., operate emitters provided at different angular positions in an array of ultrasound emitters, as the steering wheel rotates. Alternatively, if the ultrasound emitters are provided on the steering wheel, the same ultrasound emitters may be operated as the steering wheel rotates.

The ultrasound emitters may be configured to move together within the ring-shaped member such that the haptic control surfaces remain stationary relative to the ring-shaped member central axis, as the ring-shaped member moves.

The steering wheel may be movable between a first position and a second position. For example, the steering wheel may be movable laterally across the vehicle, e.g., between a first seat provided for a first occupant and a second seat provided for a second occupant. The ultrasound emitters may be configured to produce the haptic control surfaces when the steering wheel is positioned at or close to the first position. The haptic control system may comprise a plurality of further ultrasound emitters configured to produce the haptic control surfaces when the steering wheel is positioned at or close to the second position.

The haptic control surfaces may be configured to represent one or more controls of the vehicle, such as indicator controls, navigation controls and/or media controls. The system may be configured to vary the number and/or position of the controls provided according to a controls setting. The controls setting may be set by an occupant of the vehicle according to his or her control preferences. Additionally or alternatively, the control setting may be determined according to an operating mode of the vehicle, such as manual control, autonomous control or semi-autonomous control.

The system may further comprise a holographic projector configured to produce a holographic image within or adjacent to the ring-shaped member. The holographic image may provide one or more visual representations of controls of the vehicle corresponding to one or more of the haptic control surfaces.

The holographic projector may be configured such that one or more of the visual representations are visible when the occupant's hand or fingers are within a threshold distance of the corresponding haptic control surface and are substantially invisible, e.g., are not provided within the holographic image, when the occupant's hand or fingers are not within the threshold distance of the corresponding haptic control surface.

Certain controls may always be visible. The controls that are visible may depend on the operating mode of the vehicle. For example, certain controls, e.g., indicators, may always be visible when the vehicle is being driven by an occupant, e.g., when the vehicle is operating in a manual operating mode. Other controls may only appear when the occupants hand or fingers are close, e.g., within the threshold distance.

The haptic control surfaces may be provided with corresponding visual representations according to a controls setting. The holographic projector may be configured such that the visual representations remain stationary relative to the haptic control surfaces as the ring-shaped member moves.

The steering wheel may be movable between a first position and a second position. The holographic projector may be configured to produce the visual representations when the steering wheel is positioned at or close to the first position. The haptic control system may comprise a further holographic projector configured to produce the visual representations when the steering wheel is positioned at or close to the second position.

The system may further comprise a controller configured to control the operation of the ultrasound emitters to provide the haptic control surfaces. The controller may be further configured to control the operation of the holographic projector.

According to another aspect of the present disclosure, there is provided a method of operating a haptic control system for a motor vehicle, the system comprising: a steering wheel comprising a ring-shaped member configured to be held by an occupant of the vehicle; and a plurality of ultrasound emitters associated with the steering wheel, wherein the method comprises: focusing ultrasound waves from the ultrasound emitters to produce one or more haptic control surfaces within or adjacent to the ring-shaped member.

The method may comprise capturing an image of a hand or fingers of the occupant. The method may further comprise determining a position of the occupant's hand or fingers relative to the haptic control surfaces.

The method may further comprise controlling the position and/or haptic qualities of the haptic control surfaces according to the position of the occupant's hand or fingers. The method may further comprise determining a control input based on the position of the occupant's hand or fingers.

The system may further comprise a holographic projector. The method may further comprise projecting a holographic image within or adjacent to the ring-shaped member. The holographic image may be configured to represent one or more controls of the vehicle.

The method may further comprise adjusting the holographic image to represent a further control corresponding to a haptic control surface when the occupant's hand or fingers are within a threshold distance of the haptic control surface, e.g., a location in which the haptic control surface is formed or is to be formed.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3b is a schematic front view of the haptic control system shown in FIG. 3a;

DETAILED DESCRIPTION OF THE PREFERRED EMBODIMENTS

Figure 1:
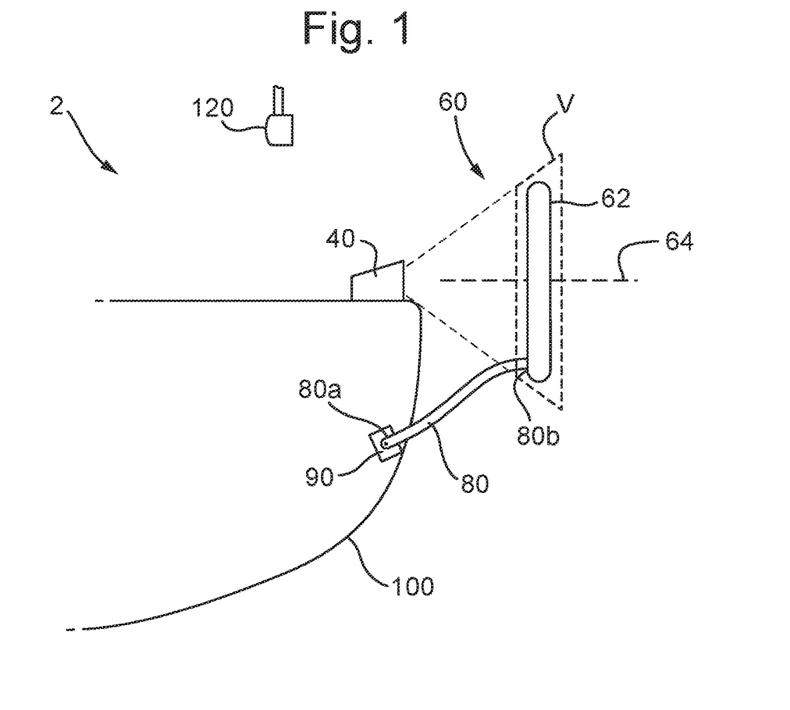
FIG. 1 is a schematic view of a haptic control system, according to arrangements of the present disclosure.

With reference to FIG. 1, a haptic control system 2 for a motor vehicle is illustrated having a haptic interface projector 40 and a steering wheel 60. The steering wheel 60 is configured to rotate about a central axis 64 of the steering wheel. Such rotation may cause a steering system of the vehicle to control the direction of travel of the vehicle, for example by rotating wheels of the vehicle. The steering wheel 60 comprises a ring-shaped member 62, configured to be held by an occupant of the vehicle in order to rotate the steering wheel. The ring-shaped member 62 may be circular and as such may be toroidal. The ring-shaped member 62 may also be circular in cross section, although the cross-sectional shape may vary about the circumference of the ring-shaped member.

The steering wheel 60 may be a steer-by-wire steering wheel, which may not be mechanically linked to a steering mechanism of the vehicle. In other words, the steering wheel 60 may send an electrical signal to a controller, which in turn sends a signal to an actuator to adjust the directional position of wheels of the vehicle. The steering wheel 60 may be operatively connected to such a controller wirelessly and/or by virtue of one or more wires.

The steering wheel 60 may be supported by a support arm 80, which may connect the steering wheel 60 to a support structure, such as a dashboard 100 or other interior trim portion of the vehicle. As depicted in FIG. 1, a first end 80a of the support arm may be coupled to the dashboard 100 and a second end 80b of the support arm may be coupled to the steering wheel 60. The support arm 80 may be coupled to the steering wheel 60 at the second end 80b in such a way as to permit rotation of the ring-shaped member 62 about the central axis 64.

The support arm 80 may comprise a boss 90 provided at the first end 80a of the support arm and the support arm 80 may be coupled to the dashboard 100 at the boss 90. The support arm 80 may connect to the steering wheel 60 at a point that is spaced apart from the center of the steering wheel. For example, the support arm 80 may connect to the steering wheel 60 at the bottom of the steering wheel 60. As depicted in FIG. 1, the support arm 80 may couple to the ring-shaped member 62 of the steering wheel.

The support arm 80 may extend away from the steering wheel 60 in a direction with a component parallel to the central axis 64 of the steering wheel 60. The support arm 80 may also extend away from the steering wheel 60 in a direction with a radial component. In other words, the support arm 80 may extend axially and radially away from the central axis 64. The support arm 80 may be substantially straight or, as shown, the support arm 80 may be curved, e.g., with a point of inflection between the first and second ends 80a, 80b. The support arm 80 may be elongate.

Figure 3A:
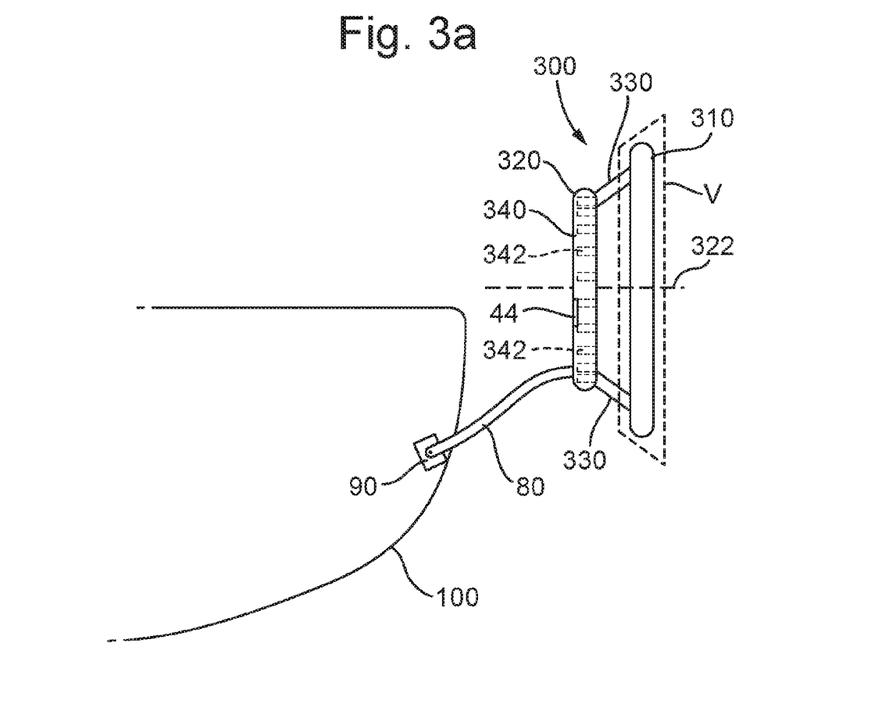
FIG. 3a is a schematic side view of a haptic control system according to another arrangement of the present disclosure.
Figure 3B:
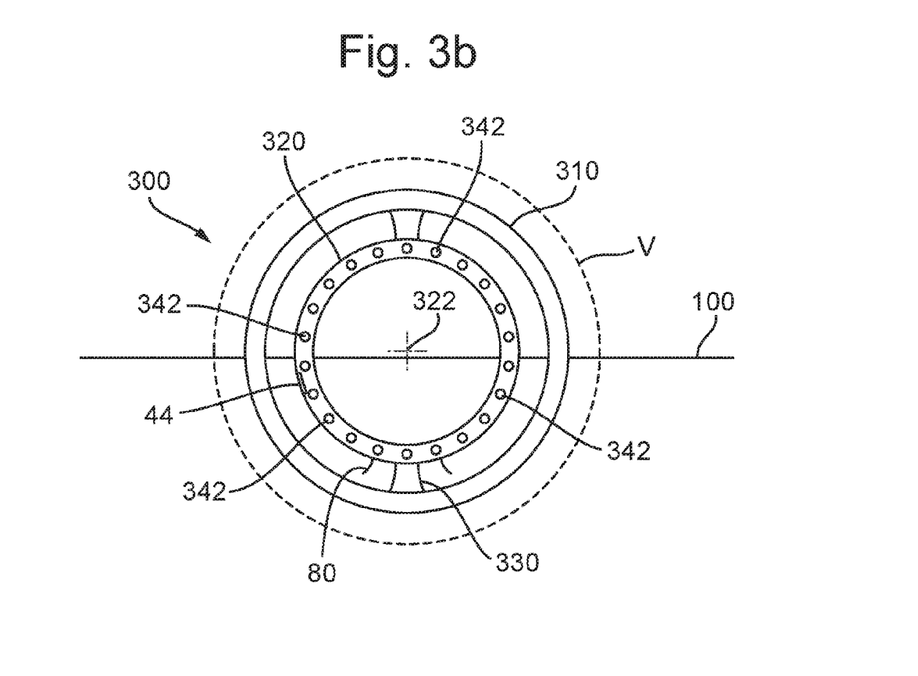

When the support arm 80 is coupled to the ring-shaped member 62, as depicted in FIG. 1, the steering wheel 60 may not comprise any support members radially inside of the ring-shaped member 62, e.g., in order to support rotation of the steering wheel 60 about the central axis 64. In other words the steering wheel 60 may be a hubless steering wheel. As depicted in FIGS. 3a and 3b, the ring-shaped member 62 may define a void 66 inside of the ring-shaped member, e.g., radially inside of an inner radius 62a of the ring-shaped member. The void 66 may be free of any supporting structure.

As depicted in FIG. 1, the haptic interface projector 40 may be provided on or in a dashboard 100 of the vehicle. However, it is equally envisaged that the haptic interface projector 40 may be mounted on any other interior trim portion or component of the vehicle. For example, the haptic interface projector 40 may be mounted on a rear view mirror 120. In alternative arrangements of the present disclosure, the haptic interface projector 40 may be provided on the steering wheel 60, as described below with reference to FIGS. 3a and 3b, or on the support arm 80.

Regardless of where the haptic interface projector 40 is mounted, the haptic interface projector 40 may be associated with the steering wheel 60 and may be configured to generate a haptic user interface within a projection volume V located within a central region radially inside the ring-shaped member 62, e.g., within the void 66, and/or adjacent to the ring-shaped member 62, e.g., radially outside the ring-shaped member 62.

Figure 2:
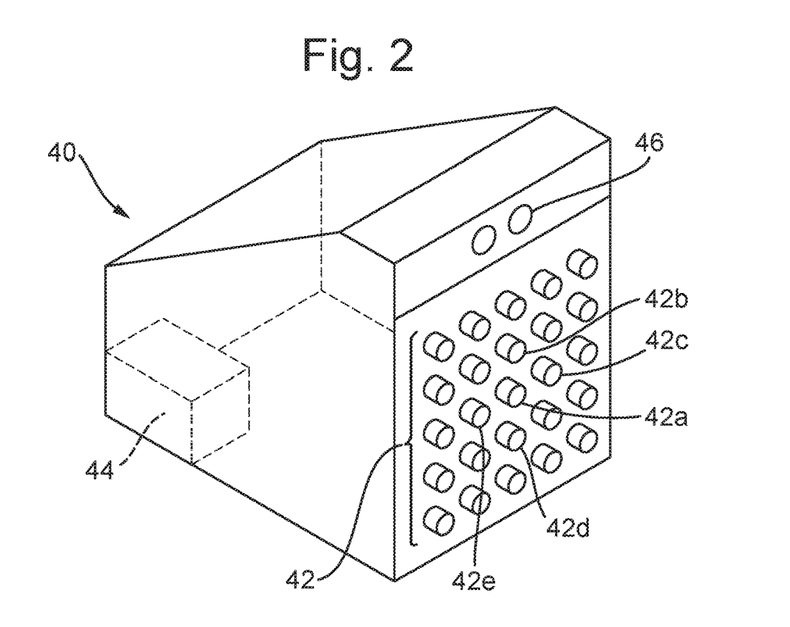
FIG. 2 is a schematic view of a haptic interface projector according to arrangements of the present disclosure.

With reference to FIG. 2, the haptic interface projector 40 may comprise a plurality of ultrasound emitters 42 and a controller 44. The ultrasound emitters 42 may be configured to project ultrasound waves into the projection volume V. Each of the ultrasound emitters 42 may have a range covering a portion of the projection volume V. Ultrasound waves produced by each ultrasound emitter may pass through a corresponding portion of the projection volume according to the emitters range. As shown in FIG. 2, the ultrasound emitters 42 may be arranged in an array, such as a square array or a circular array, in order to allow ultrasound to be projected throughout the projection volume V.

The ultrasound emitters 42 in the array may be arranged such that the ranges of adjacent ultrasound emitters overlap. In other words, the portion of the projection volume V that is within the range of a first ultrasound emitter 42a may overlap with portions of the projection volume covered by one or more adjacent ultrasound emitters 42b, 42c, 42d, 42e. The ultrasound emitters 42 may be configured such that each position within the projection volume V is within the range of two or more of the ultrasound emitters.

When two or more adjacent ultrasound emitters, are projecting ultrasound waves at substantially the same time, the ultrasound waves may combine, e.g., constructively interfere, within the portions of the projection volume V, in which the ranges of the adjacent ultrasound emitters overlap. When one or more groups of ultrasound emitters are operated substantially simultaneously, ultrasound waves produced by more than one of the ultrasound emitters 42 may combine with the ultrasound waves produced by one or more other ultrasound emitters to produce one or more areas of focused ultrasound, which may encompass one or more areas of overlap between the rages of adjacent ultrasound emitters. The controller 44 may control the operation of the plurality of ultrasound emitters 42 in order to determine the number, size and/or shape of the areas of focused ultrasound.

When an occupant of the vehicle moves his or her hand or fingers into one of the areas of focused ultrasound, the focused ultrasound waves may impinge upon the occupant's hand or fingers. The area of focused ultrasound may be configured to define a virtual object within the projection volume. When the occupant interacts with, e.g., touches, the virtual object, the focused ultrasound waves impinging on the occupant's hand or fingers may create the impression that the occupant is touching a physical object. In addition to controlling the size and/or shape of a virtual object felt by the occupant, the controller 44 may control the operation of the ultrasound emitters 42 in order to control the haptic qualities of the virtual object. For example, the controller 44 may control the amplitude of the ultrasound waves in order to control how hard or soft the virtual object appears to feel.

The haptic control system 2 may further comprise a camera 46, such as a 3D camera, configured to capture an image of the occupant's hand or fingers. As depicted in FIG. 2, the camera 46 may be provided on the haptic interface projector 40. Alternatively, the camera 46 may be provided on the steering wheel 60, the dashboard 100 or another interior trim portion of the vehicle.

The controller 44 may process the image captured by the camera in order to determine a location and/or orientation of the occupant's hand or fingers. The controller 44 may determine whether the occupant is touching an area of focused ultrasound waves. In other words, the controller 44 may determine whether the occupant is attempting to interact with the virtual object being created by the haptic interface projector 40. If the controller 44 determines that the occupant is interacting with the virtual object, the controller 44 may adjust the operation of the ultrasound emitters in order to adjust the size, position and or haptic qualities of the area of focused ultrasound waves. The haptic interface projector 40 may thereby give the impression to the occupant that the virtual object is responding to the interaction. For example, the haptic interface projector 40 may create the impression of a button being pressed, a dial being turned or a lever being thrown. The virtual object may therefore provide a haptic control surface that the occupant may interact with.

The haptic control surfaces generated by the haptic interface projector 40 may be substantially invisible to the occupant. Hence, it may not be necessary for the haptic interface projector 40 to generate the haptic control surfaces unless the occupant is attempting to interact with the haptic control surfaces. The haptic control system may be configured such that the haptic control surfaces are only generated by the haptic interface projector 40 when the occupant's hand or fingers are within a threshold distance of the location at which the haptic control surfaces are to be formed. In some arrangements, when the occupant's hand or fingers are within the threshold distance of one or more locations at which one or more haptic control surfaces are to be formed, the haptic interface projector may be operated to generate the corresponding haptic control surfaces. One or more further haptic control surfaces that are to be generated at locations away from the occupant's hand or fingers, e.g., more that the threshold distance away, may not be generated. In other arrangements, when the occupant's hand or fingers are within the threshold distance of one or more of the locations, or is within the threshold distance of the projection volume V or the ring-shaped member 62, each of the haptic control surfaces may be provided.

The haptic control surfaces provided by the haptic interface projector 40 may correspond to controls of one or more systems of the vehicle. If the controller 44 determines that the occupant is interacting with a haptic control surface, e.g., according to the position of the occupant's hand or fingers, the controller 44 may generate a control input, which may be sent to a corresponding system of the vehicle. The control input may be an electrical signal, which may be sent to the corresponding system wirelessly or via one or more wires.

In the arrangement depicted in FIGS. 1 and 2, the camera 46 is provided within the haptic interface projector 40; however, it is equally envisaged that the camera 46 may be provided separately to the haptic interface projector 40.

With reference to FIGS. 3*a* and 3*b*, in another arrangement of the present disclosure, the vehicle may comprise a first steering wheel 300 having a ring-shaped member 310 and a second further ring-shaped member 320. The ring-shaped member 310 may be configured to be held by the occupant of the vehicle in order to rotate the steering wheel 300 in the same way as the ring-shaped member 62. However, the support arm 80 may be coupled to the further ring-shaped member 320 and may be configured to support the steering wheel 300 while allowing the steering wheel 300 to be rotated by the occupant.

The further ring-shaped member 320 may be substantially circular and may be concentric with the ring-shaped member 310. In the example depicted in FIG. 3*a*, the further ring-shaped member 320 has a smaller diameter than the ring-shaped member 310, however, it is also contemplated that the further ring-shaped member 320 may have a diameter that is larger than that of the ring-shaped member 310. As depicted in FIG. 3*a*, the further ring-shaped member 320 may be in a plane that is spaced apart from the plane in which the ring-shaped member 310 resides. In other words, the ring-shaped member 310 and further ring-shaped member 320 may be axially spaced apart. The ring-shaped member 310 may be coupled to the further ring-shaped member 320 by one or more support members 330. The support members 330 may extend in a direction with components in the axial and radial directions of the ring-shaped member 310 and further ring-shaped member 320.

A haptic interface projector 340 may be provided on the steering wheel 300. In the arrangement depicted in FIGS. 3*a* and 3*b*, the haptic interface projector 340 is provided within the further ring-shaped member 320 of the steering wheel and a plurality of ultrasound emitters 342 of the haptic interface projector 340 are arranged circumferentially around the further ring-shaped member 320. In other arrangements, one or more of the ultrasound emitters 342 may additionally or alternatively be provided on the ring-shaped member 310 and/or the support members 330. In some arrangements, the haptic interface projector 340 may be provided on the steering wheel 60 depicted in FIGS. 1 and 2 (e.g., without the further ring-shaped member 320). In such arrangements, the ultrasound emitters 342 may be arranged around the ring-shaped member 62. Hence, the features described below in relation to the further ring-shaped member 320 or the ring-shaped member 310 may apply equally to the ring-shaped member 62.

In the arrangements shown in FIGS. 3*a* and 3*b*, the ultrasound emitters 342 are provided in recesses formed in the further ring-shaped member 320. In some arrangements, the ultrasound emitters 342 may be recessed such that the ultrasound emitters 342 do not extend beyond the outer surface of the ring-shaped member 310 or further ring-shaped member 320. However, it is contemplated that the ultrasound emitters 342 may be coupled to an outer surface of the further ring-shaped member 320, e.g., may not be recessed. The ultrasound emitters coupled to the outer surface of the further ring-shaped member 320 may face radially outwardly, inwardly or axially.

The ring-shaped member 310, further ring-shaped member 320 and/or the ultrasound emitters 42 may be covered by a material, e.g., an upholstering material, that permits ultrasound waves to pass through the material. In this way, the presence of the ultrasound emitters 342 may not be visible to the occupant.

In the arrangement shown in FIGS. 3a and 3b, the ultrasound emitters 342 are arranged in a single row around the further ring-shaped member 320 at a constant radius about a central axis 322 of the further ring-shaped member 320. However, it is contemplated that the radial position of the ultrasound emitters 342 relative to the central axis 322 may vary around the circumference of the further ring-shaped member 320. In some arrangements, the ultrasound emitters 342 may be provided in two or more rows at different constant or variable radial distances from the central axis 322.

As mentioned above, the ultrasound emitters 342 may be provided on the ring-shaped member 310. However, as the ring-shaped member 310 is configured to be held by the occupant to rotate the steering wheel 300, when the occupant holds the ring-shaped member 310 one or more of the ultrasound emitters 342 may be blocked or covered by the occupant's hand or fingers. This may prevent the haptic interface projector 340 from creating the haptic control surfaces in portions of the projection volume V that are covered by the blocked ultrasound emitters 342.

In order to reduce the possibility of blocked ultrasound emitters restricting where the haptic control surfaces may be created by the haptic interface projector 340, when the ultrasound emitters 342 are provided on the ring-shaped member 310, additional ultrasound emitters be provided on the ring-shaped member 310. The additional ultrasound emitters may be configured to cover, e.g., project ultrasound waves into, the same portions of the projection volume V as the ultrasound emitters. The additional ultrasound emitters may be spaced apart from the ultrasound emitters 342 configured to cover the same portion of the projection volume V. The chance of ultrasound emitters 42 and corresponding additional ultrasound emitters being blocked at the same time may be reduced.

Figure 4A:
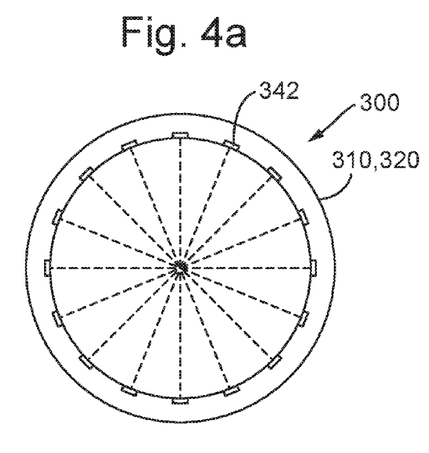
FIG. 4a is a schematic view showing an arrangement of ultrasound emitters on a steering wheel according to one arrangement of the present disclosure.
Figure 4B:
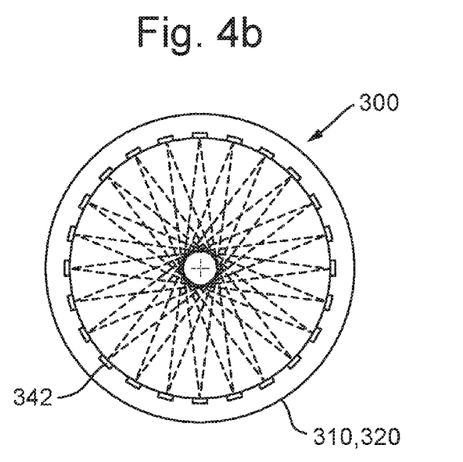
FIG. 4b is a schematic view showing an arrangement of ultrasonic emitters on a steering wheel, according to another arrangement.
Figure 4C:
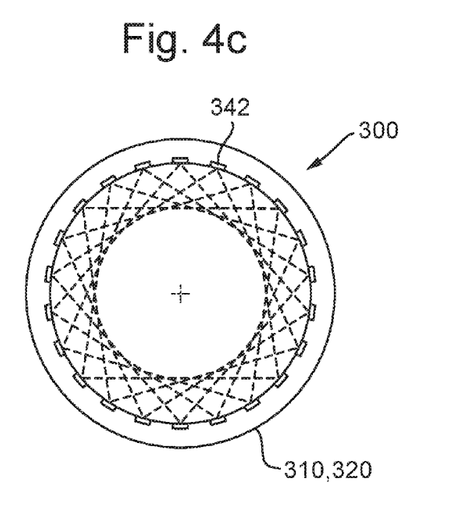
FIG. 4c is a schematic view showing an arrangement of ultrasonic emitters on a steering wheel, according to a further arrangement.

With reference to FIGS. 4a, 4b and 4c, the ultrasound emitters 42 may be provided in one or more sets of ultrasound emitters. In FIGS. 4a, 4b and 4c, the lines extending from each of the ultrasound emitters indicates the direction of the projection of ultrasound from each of the emitters. Each emitter in a particular set may emit ultrasound in directions having the same relative magnitudes of radial and tangential components. As depicted, each of the sets of ultrasound emitters may be configured to project ultrasound in directions having different relative magnitudes of radial and tangential components. For example, a first set of ultrasound emitters, depicted in FIG. 4a, may be configured to emit ultrasound in a substantially radial direction. A second set of ultrasound emitters, depicted in FIG. 4b, may be configured to emit ultrasound in a direction having a small tangential component, e.g., a tangential component less than a radial component. A third set of ultrasound emitters, depicted in FIG. 4c, may be configured to emit ultrasound in a direction having a larger tangential component, e.g., a tangential component greater than or equal to a radial component.

Providing ultrasound emitters 342 in the arrangements depicted in FIGS. 4a-4c may allow ultrasound to be focused at a plurality of radial distances from the central axis 322 of the steering wheel 300. Furthermore, providing a set of ultrasound emitters 342 configured to project ultrasound in a direction having a large tangential component may reduce the possibility of ultrasound emitters 342 being blocked by an occupant's hands when they are attempting to interact with a haptic control surface generated by the ultrasound emitters. Each of the ultrasound emitters 342 may be configured to emit ultrasound in substantially one direction. Alternatively, as depicted in FIGS. 4b and 4c, one or more of the ultrasound emitters may be configured to project ultrasound in two or more directions.

Figure 4D:
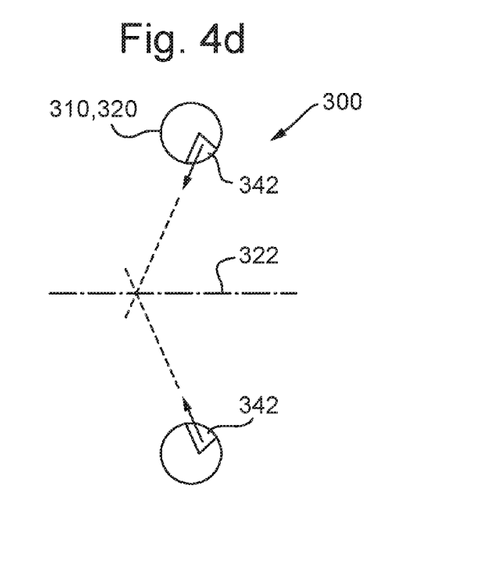
FIG. 4d is a cross sectional view of a steering wheel comprising ultrasound emitters according to arrangements of the present disclosure.

With reference to FIG. 4d, the ultrasound emitters 342 may be provided on the ring-shaped member 310 or further ring-shaped member 320 at a rearward location of the ring-shaped member 310 or further ring-shaped member 320 relative to the occupant, e.g., in the direction of the central axis 322. The ultrasound emitters 342 may be configured to project ultrasound forwards, e.g., towards the occupant. This may improve the ability of the ultrasound interface projector 340 to give the impression that the occupant is pressing against a surface when interacting with the haptic control surfaces.

When the ultrasound emitters 342 are provided on the ring-shaped member 310, further ring-shaped member 320 and/or the support members 330, the ultrasound emitters 342 may be configured, e.g., positioned, such that the projection volume covered by the ultrasound emitters is substantially the same as the projection volume V covered by the ultrasound emitters 42 shown in FIGS. 1 and 2. The haptic interface projector 340 may therefore perform in the same way as the haptic interface projector 40 described above with reference to FIGS. 1 and 2 and may allow one or more haptic control surfaces to be created within the projection volume V that the occupant may interact with.

Figure 5:
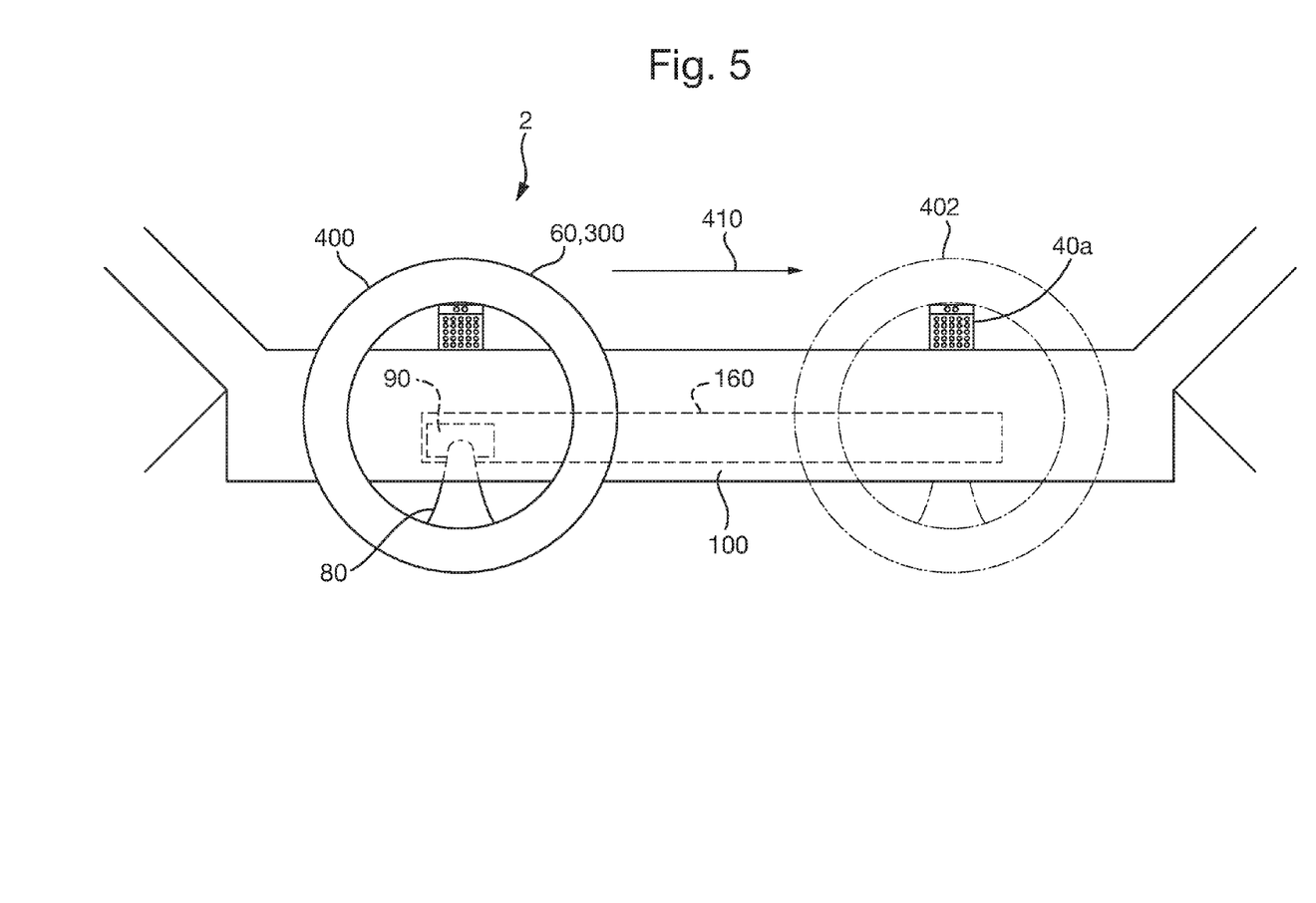
FIG. 5 is a schematic view of a haptic control system according to arrangements of the present disclosure.

With reference to FIG. 5, the steering wheel 60, 300 may be movable relative to the dashboard 100 from a first position 400 to a second position 402, in which a second occupant of the vehicle may steer the steering wheel 60, 300. In other words, the steering wheel 60, 300 may move in a lateral direction 410 of the vehicle from one end of the dashboard 100 to another end of the dashboard. Control of the vehicle may thus be passed from a first occupant to a second occupant of the vehicle. Other systems of the vehicle may adapt for the other occupant to control the vehicle. For example, pedals may extend from the floor of the footwell and mirrors may be adjusted so that the new driver has appropriate views. The steering wheel may be movable in additional or alternative directions, e.g., to stow the steering wheel, to adjust the steering wheel position for a particular driver or for any other reason.

As depicted in FIG. 5, the vehicle may comprise a track 160 provided within the interior trim portion of the vehicle. The track 160 may extend across the interior trim portion, e.g., across the dashboard 100, in the lateral direction 410. In particular, the track 160 may extend between the first positon 400 and the second position 402. The boss 90 may be coupled to the dashboard 100 at the track 160 and may be configured to slide in the track 160 to allow the steering wheel 60, 300 to be moved between the first and second positions 400, 402.

When the steering wheel 60, 300 moves between the first positon 400 and the second position 402, it may be desirable for the virtual objects, e.g., the haptic interface surfaces created by the haptic interface projector 40, 340 to remain in the same position relative to the steering wheel 60, 300 regardless of the position of the steering wheel 60, 300.

When the haptic interface projector 40, 340 is provided on the steering wheel, e.g., on the ring-shaped member 62, 310 or further ring-shaped member 320, or the support arm 80, the haptic interface projector may be moved together with the steering wheel, such that the haptic interface surfaces may be generated at the same position relative to the steering wheel 60, 300 regardless of the position of the steering wheel 60, 300. However, when the haptic interface projector 40 is provided on an interior trim portion of the vehicle, such as the dashboard 100 as depicted in FIG. 1, the haptic interface projector 40 may not be capable of providing the haptic interface surfaces at each desirable position of the steering wheel.

As shown in FIG. 5, the haptic interface projector 40 may be configured to generate the haptic interface surfaces when the steering wheel 60, 300 is located at or close to the first position 400, e.g., closer to the first position 400 than the second position 402. The vehicle may comprise a further haptic interface projector 40a configured to generate the haptic interface surfaces when the steering wheel 60, 300 is at or close to the second position 402, e.g., closer to the second position 402 than the first position 400.

At intermediate positions between the first and second positions 400, 402, neither the haptic interface projector 40 nor the further haptic interface projector 40a may be capable of producing the haptic interface surfaces in the desired position, e.g., relative to the steering wheel 60, 300. For example, the arrangement of the ultrasound emitters 42 may not allow the ultrasound waves to be focused at the desired location relative to the steering wheel. In such intermediate positions, the haptic interface surfaces may not be provided.

In many cases, it may not be desirable to operate the controls provided by the haptic control system 2 when the steering wheel 60 is between the first and second positions 400, 402. However, if desirable, in order to allow the haptic interface surfaces to be provided in the desired position relative to the steering wheel 60, 300 at intermediate positions between the first and second positions 400, 402, one or more additional haptic interface projectors (not shown) may be provided within the vehicle, The additional haptic interface projectors may be coupled to the dashboard 100 between the haptic interface projector 40 and the further haptic interface projector 40a and may be configured to generate the haptic interface surfaces when the steering wheel 60, 310 is located at an intermediate position between the first and second positions 400, 402.

In other arrangements of the disclosure, as an alternative to providing the additional and further haptic interface projectors 40, 40a, the haptic interface projector 40 may be provided with a further array of ultrasound emitters. The further array of ultrasound emitters may be arranged in order to be able to generate the haptic interface surfaces when the steering wheel 60, 300 is at or close to the second position 402. If desirable, the haptic interface projector 40 may comprise additional arrays of ultrasound emitter arranged to generate the haptic interface surfaces when the steering wheel 60, 300 is located between the first and second positions 400, 402. Alternatively again, additional ultrasound emitters may be provided with the array and/or further array such that the ultrasound emitters are able to provide the haptic control surfaces at any desirable position of the steering wheel, e.g., between the first and second positions 400, 402. For example, an array of ultrasound emitters may be provided that extends across the dashboard 100 between the first and second positions 400, 402.

The haptic control system 2 may comprise one or more sensors (not shown) configured to determine the position of the steering wheel 60, 300 between the first and second positions 400, 402. For example, the haptic control system 2 may comprise a potentiometer provided along the track 160. A first contact of the potentiometer may be provided at a first end of the track and a second contact of the potentiometer may be provided on the boss 90, such that an electrical resistance between the first and second contacts varies as the steering wheel 60, 300 is moved between the first and second positions 400, 402.

The position of the steering wheel 60, 300 determined by the sensors may be input to the controller 44 of the haptic interface projector 40, further haptic interface projector 40a and any additional haptic interface projectors, which may adjust the operation of the ultrasound emitters 42 accordingly, e.g., such that the positions of the haptic interface surfaces are unchanged relative to the steering wheel 60, 300.

As described above, the ring-shaped member 62 of the steering wheel may be rotated by the occupant about the central axis 64 in order to steer the vehicle. In contrast to when the steering wheel is translated between the first and second positions 400, 402, when the ring-shaped member is rotated, it may be desirable for one or more of the haptic control surfaces not to rotate together with the ring-shaped member 62. In other words, it may be desirable for the haptic control surfaces to remain stationary relative to the dashboard 100 as the ring-shaped member 62 rotates. However, in some arrangements, it may be desirable that one or more of the haptic control surfaces do rotate together with the ring-shaped member 62.

In either case, the controller 44 may determine an angle of rotation of the ring-shaped member 62, e.g., via one or more sensors provided on the steering wheel 60, and may adjust the operation of the ultrasound emitters 42 to adjust and/or maintain the positions and/or orientations of the haptic control surfaces accordingly. For example, in the case of the emitters 342 being provided on the ring-shaped member 62, 310 or further ring-shaped member 320, one or more of the haptic control surface configured to rotate together with the ring-shaped member may be provided by the same ultrasound emitter 342 and one or more haptic control surfaces configured to remain stationary as the steering wheel rotates, may be generated by ultrasound emitters 342 provided a different angular position on the ring-shaped member or further ring-shaped member, e.g., angularly offset according the angle of rotation of the steering wheel 60. When the emitters 42 are provided on the dashboard 100 or other interior trim portion, one or more of the haptic control surface configured to remain stationary as the steering wheel rotates may be provided by the same ultrasound emitters 42 and one or more haptic control surfaces configured to rotate together with the ring-shaped member may be generated by ultrasound emitters 342 provided a different angular position within the array of ultrasound emitters 42.

As described above, the haptic control system 2 may be configured to provide one or more haptic control surfaces that the occupant may interact with to control the operation of systems of the vehicle. For example, as shown in FIG. 5, the haptic control system 2 may be configured to provide a haptic indicator control surface 200 and/or a haptic transmission control surface 220.

The type, number and/or position of the controls provided by the haptic control system 2 may be determined according to a controls setting. The controls setting may be set by the occupant according to their preferences. For example, a first occupant's preference may be to simplify the controls provided in the vehicle while they are driving the vehicle. The first occupant may set the control setting such that a minimum number of controls are provided, e.g., the controls that are required for operating the vehicle. A second occupant may wish to be able to control one or more accessory systems of the vehicle using haptic interface surfaces provided by the haptic control system and may set the controls setting accordingly. For example, the second occupant may wish to control an entertainment system of the vehicle by interacting with the haptic control surfaces. The controls setting may be at least partially determined according to an operating mode of the vehicle, for example, whether the vehicles is operating in a manual driving mode, an autonomous driving mode or a semi-autonomous driving mode.

Figure 6A:
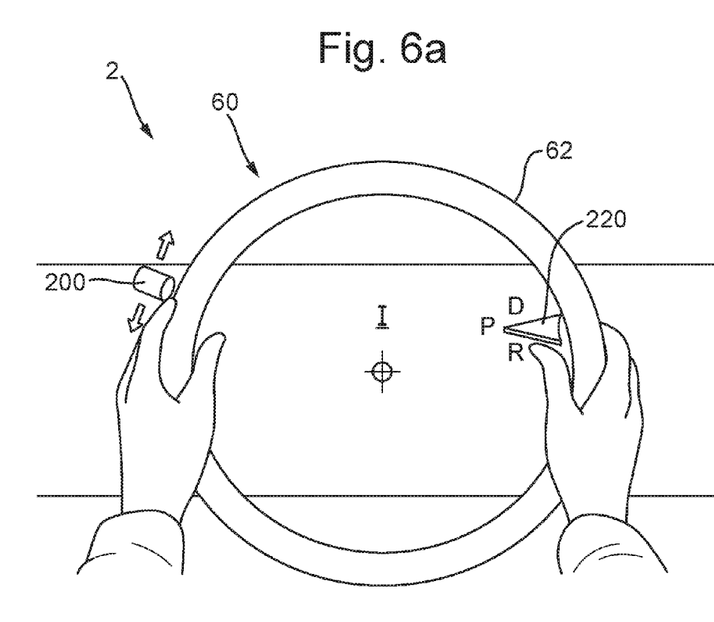
FIG. 6a shows the haptic control system, according to arrangements of the present disclosure, in a first operating mode.

In the arrangement depicted in FIG. 6a, the vehicle is operating in the manual driving mode. In the manual driving mode, the controls setting may be configured such that haptic control surfaces are provided for each of the controls necessary for operating the vehicle (which may or may not be provided by other, e.g., physical, controls of the vehicle). Additionally, when the vehicle is operating in the manual driving mode, the controls setting may be configured to omit any controls that may distract the driver from operating the vehicle.

Figure 6B:
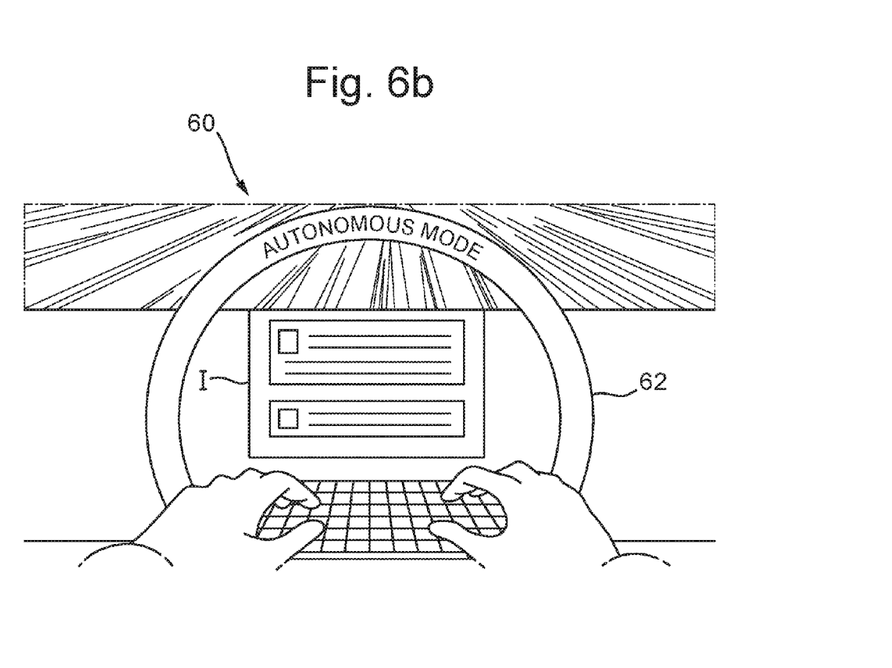
FIG. 6b shows the haptic control system, according to arrangements of the present disclosure, in a second operating mode.

In the arrangement depicted in FIG. 6b, the vehicle is operating in the autonomous driving mode. In the autonomous driving mode, the controls setting may not be set to include any of the driving controls, e.g., by default, and the user may be capable of adjusting the controls setting to provide any desirable controls. As depicted in FIG. 6b, the haptic control system may be configured to provide keyboard controls for operating a computing device of the vehicle.

As described above, although the occupant may be able to interact with the haptic interface surfaces by touch, the haptic interface surfaces may not be visible to the occupant. In some cases, this may be desirable in order to prevent the area around the steering wheel of the vehicle from appearing cluttered. However, in other cases, it may be desirable for the occupant to be able to see a control provided by the haptic interface surfaces, for example in order to determine the positon of a switch or lever provided by a haptic control surface, or to determine the location of a haptic interface surface that they are unfamiliar with.

Figure 7:
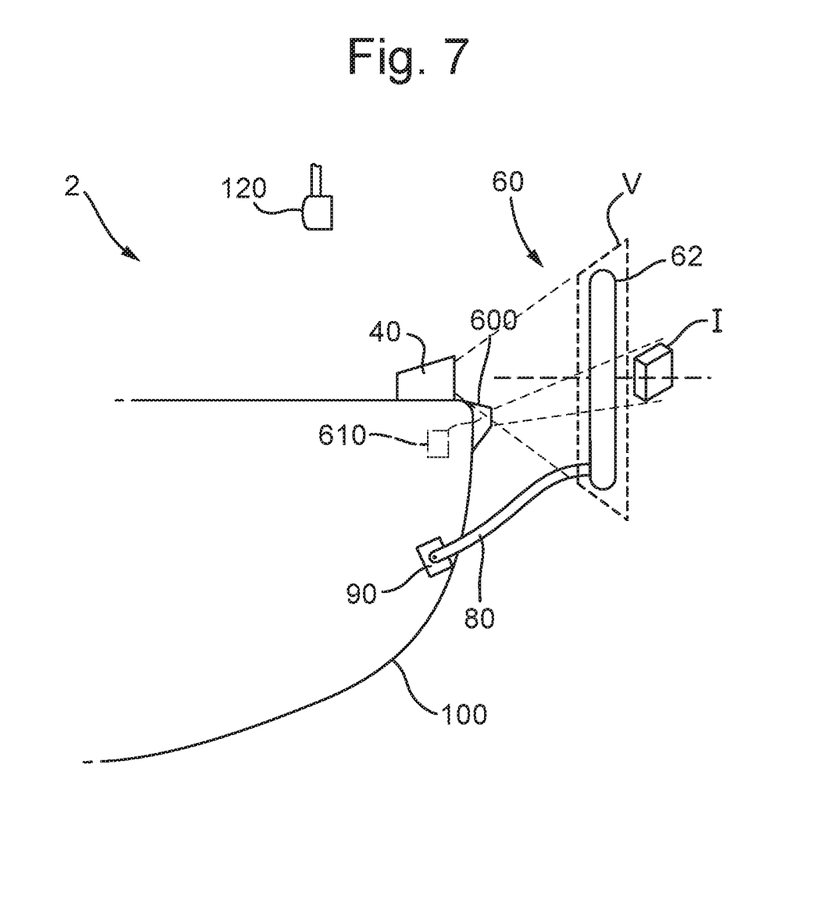
FIG. 7 shows a schematic view of a haptic control system comprising a holographic projector, according to arrangements of the present disclosure.

With reference to FIG. 7, in order to allow the occupant to visually interact with virtual controls provided by the haptic control system 2, the haptic control system may further comprise a holographic projector 600. The holographic projector 600 may be configured to generate a holographic image I within and/or adjacent to the steering wheel 60, 300. The holographic image I may be configured to represent one or more controls corresponding to the haptic control surfaces provided by the haptic interface projector.

As depicted in FIG. 7, the holographic projector 600 may be coupled to the dashboard 100 in a similar way to the haptic interface projector 40. Alternatively, the holographic projector 600 may be coupled to any other interior trim portion of the vehicle, such as the rear view mirror 120. Alternatively again, the holographic projector 600 may be mounted on the steering wheel 60, 300 or the support arm 80. In the arrangement depicted in FIG. 7, the haptic interface projector 40 is coupled to the dashboard 100, however, it is contemplated that the haptic interface projector 40 may be mounted on any other interior trim portion of the vehicle or may be mounted on the steering wheel 60, 300, e.g., or a ring-shaped member 62, 310 or further ring-shaped member 320 of the steering wheel 60, 300 as described above.

The holographic projector 600 may be configured to provide one or more visual representations of vehicle controls, which correspond to one or more of the haptic control interfaces, e.g., one or more haptic control interfaces within a first group of haptic control interfaces. One or more haptic control surfaces within a second group of haptic control interfaces, may not be provided with corresponding visual representations. The visual representations to be provided by the holographic projector 600 may be set according to the occupant's preferences. For example, a controller 610 of the holographic projector may refer to a control setting set by the occupant in order to determine which visual representations to provide. In this way, the holographic projector 600 may allow controls of the vehicle provided by the haptic control system 2 to be seen by the user as desired.

As described above, the holographic control system may be configured such that the haptic control surfaces are only generated when the occupant's hand or fingers are within a second threshold distance from the location at which the haptic control surface is formed. In other words, the haptic control surface may only be generated when it is determined that the occupant is attempting to interact with the haptic control surface. In contrast to this, when the holographic projector 600 is configured to provide visual representations corresponding to particular haptic control surfaces, it may be desirable for the visual representation to be provided at all times, e.g., even when the haptic interface is not being generated by the haptic interface projector. By providing the visual representation, the occupant may be able to determine the location of the haptic control surface and/or the setting selected with a switch or lever provided as the haptic control surface. In some cases however, it may be desirable for one or more of the haptic interface surfaces to be substantially invisible during normal operation of the vehicle, but to become visible when the occupant wishes to physically interact with the haptic control interface.

Figure 8:
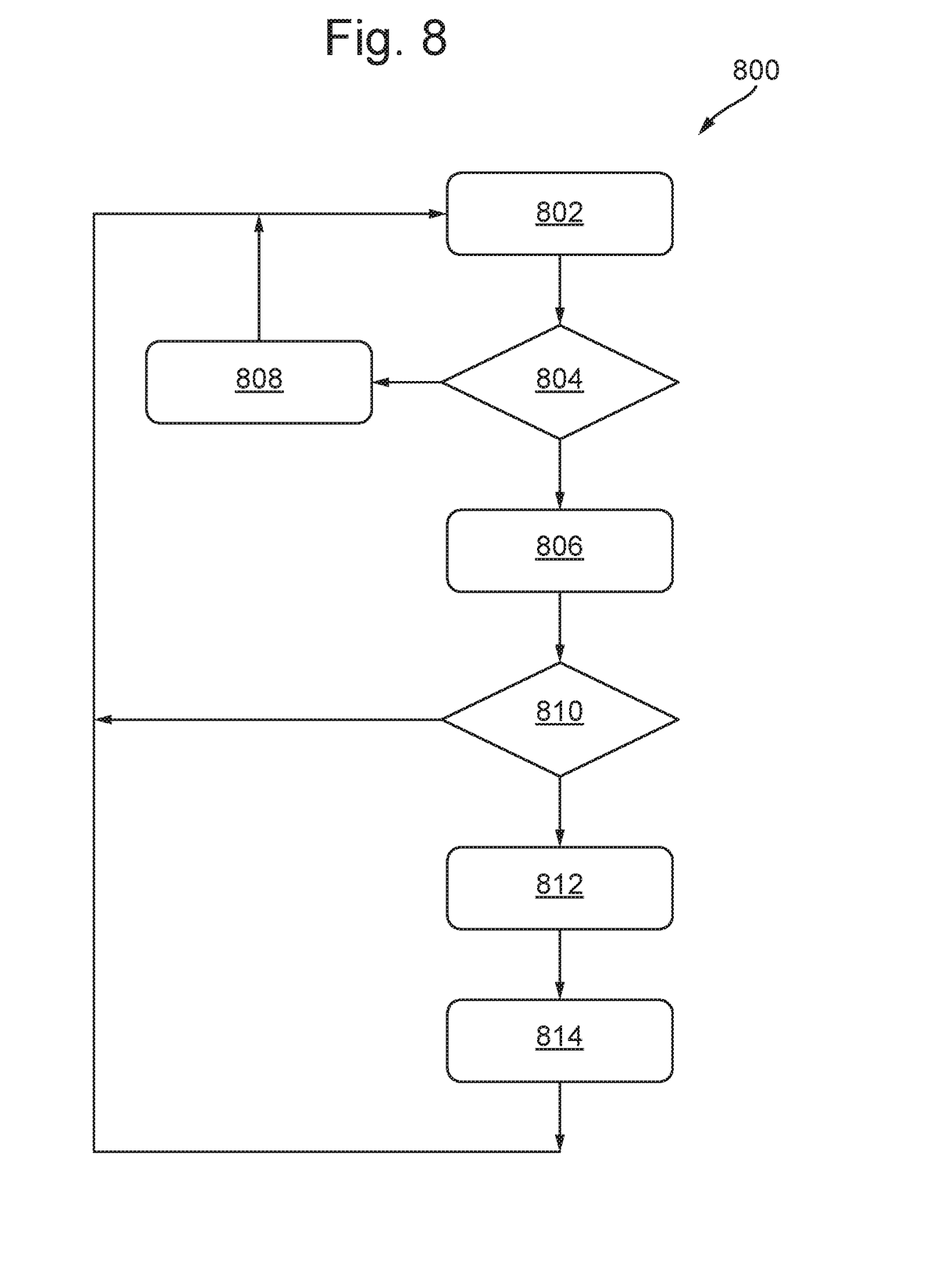
FIG. 8 shows a method of operating the haptic control system according to arrangements of the present disclosure.

With reference to FIG. 8, the controller 610 may be configured to operate the haptic control system 2 using a method 800, according to arrangements of the present disclosure. The method 800 comprises a first step 802, in which the controller 610 determines the location and/or orientation of the occupant's hand or fingers in 3D space, e.g., by referring to an image captured by the camera. In a second step 804, the controller 610 may determine whether the occupant's hand or fingers are within the second threshold distance of the particular haptic control surface.

If the occupant's hand or fingers are within the second threshold distance of the particular haptic control surface, the method may proceed to a third step 806, in which the operation of the holographic projector 600 is controlled to provide a visual representation for the particular haptic control surfaces (unless the visual representation is permanently displayed).

The second threshold distance may be the same as the threshold distance at which the haptic interface projector is operated to generate the haptic control surface. Alternatively, the second threshold distance may be smaller or larger that the threshold distance.

If in the second step 804, the occupant's hand or fingers are not within the second threshold distance of the particular haptic control surface, the method may proceed to a fourth step 808, in which the visual representation is not displayed, e.g., is turned off, (unless the visual representation is permanently displayed). After performing the fourth step 808, the method 800 may return to the first step 802.

Once the visual representation has been provided in the third step 806, the method 800 may proceed to a fifth step 810, in which it is determined whether the occupant's hand or finger has encroached on a space in which a haptic control surface is provided, e.g., whether the occupant is attempting to interact with the haptic control surface. If the occupant's hand or finger has not encroached on a space in which the haptic control surface is provided, the method 800 may return to the first step 802. Otherwise, if it is determined the occupant is attempting to interact with the haptic control surface, the method may proceed to a sixth step 812 in which the ultrasound emitters are operated to provide appropriate haptic feedback to the user, e.g., by adjusting the position and/or haptic qualities of the control surface.

After the sixth step 812, the method may proceed to a seventh step 814, in which the operation of the holographic projector is controlled to adjust the visual representation corresponding to the haptic control surface that the occupant as interacted with, e.g., to indicate a new position of a virtual switch or otherwise indicate that an alternative setting has been selected. Within the seventh step 812, the controller 44, 610 may apply the setting selected by the occupant. Alternatively, the controller 44, 610 may generate a control input according to the input or selection may by the occupant. The control input may be sent to a corresponding system of the vehicle to be processed, e.g., in order to apply the setting selected by the occupant. For example, the controller 44, 610 may send a control input to a lighting system of the vehicle in order to turn on an indicator of the vehicle. After the seventh step 812, the method may return to the first step 802.

As described above, as the occupant rotates the ring-shaped member 62, 310 about the central axis 64, one or more of the haptic control surfaces may rotate together with the ring-shaped member, while one or more others of the haptic control surfaces may remain stationary, e.g., relative to the dashboard 100. It may be desirable for the visual representations to be provided in the same locations relative to the haptic control surfaces regardless of any rotation of the ring-shaped member 62, 310. Hence, the holographic projector 600 may be configured to adjust or maintain the positions of the visual representations appropriately. For example, the controller 44, 610 may be configured to monitor the rotational position of the steering wheel via one or more sensors of the steering wheel 60 and adjust the operation of the holographic projector 600 accordingly.

Furthermore, in many arrangements, it may be desirable for the visual representations to be provided in the same location relative to the haptic control surfaces when the steering wheel is located in the first position 400 and in the second position 402. Additionally, it may be desirable for the visual representations to be provided in the same locations when the steering wheel is at an intermediate position between the first and second positions. The haptic control system may comprise one or further holographic projectors configured to generate the holographic image and provide the visual representations when the steering wheel is located away from the first position. For example, the holographic projector 600 may be configured to produce the visual representations when the steering wheel is positioned at or close to the first position and a first further holographic projector may be configured to produce the visual representations when the steering wheel is positioned at or close to the second position.

In some arrangements, the holographic projector 600 may be configured such that it is able to provide the visual representations in the same locations relative to the haptic control surfaces, regardless of the position of the steering wheel. For example, the holographic projector 600 may comprise a mirror configured to move together with the steering wheel 60, 300 in order to adjust the position of the holographic image as the steering wheel moves. In such arrangements, the further holographic projectors may not be provided.

In the arrangements shown in FIG. 7, the controller 610 of the holographic projector is separate from the controller 44 of the haptic interface projector. However, it is equally envisaged that the functions of the both controllers may be performed by a single controller provided within the vehicle. For example, the functions of the controllers 44, 610 may be performed by two or more modules of the single controller.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. An ultrasonic haptic control system for a motor vehicle, comprising:
   a steering wheel assembly comprising a ring-shaped member rotatable about a central axis to steer the vehicle; and
   a plurality of ultrasound emitters associated with the steering wheel and configured to focus ultrasound waves within a central region about which the ring-shaped member circumferentially extends and/or radially outside of and adjacent to the ring-shaped member to form one or more haptic control surfaces, wherein the plurality of ultrasound emitters emit ultrasound waves having a tangential component.

2. The ultrasonic haptic control system of claim 1, wherein one or more of the ultrasound emitters are provided in an array of ultrasound emitters on a trim portion of the vehicle, the array of ultrasound emitters being configured to project ultrasound towards the steering wheel.

3. The ultrasonic haptic control system of claim 1, wherein one or more of the ultrasound emitters are provided on the ring-shaped member.

4. The ultrasonic haptic control system of claim 1, wherein the steering wheel comprises a further ring-shaped member offset from the ring-shaped member along the central axis, wherein one or more of the ultrasound emitters are provided on the further ring-shaped member.

5. The ultrasonic haptic control system of claim 1, wherein the system further comprises a camera configured to capture an image of a hand or fingers of the occupant.

6. The ultrasonic haptic control system of claim 1, wherein the system is configured to determine a position of the occupant's hand or fingers relative to locations at which the haptic control surfaces are formed.

7. The ultrasonic haptic control system of claim 6, wherein the system is configured to provide the haptic control surfaces when the occupant's hand or fingers are within a threshold distance of the locations at which the haptic control surfaces are formed; and
   wherein the system is configured not to provide the haptic control surfaces when the occupant's hand or fingers are not within the threshold distance of the locations.

8. The ultrasonic haptic control system of claim 6, wherein the system is configured to control the operation of the ultrasound emitters to control the position and/or haptic qualities of the haptic control surfaces according to the position of the occupant's hand or fingers, and wherein the system is configured to determine a control input based on the position of the occupant's hand or fingers.

9. The ultrasonic haptic control system of claim 1, wherein the steering wheel is movable within the vehicle, such that the ring-shaped member central axis is movable between first and second positions, wherein the haptic control system is configured such that the haptic control surfaces remain stationary relative to the ring-shaped member central axis as the ring-shaped member moves.

10. The ultrasonic haptic control system of claim 1, wherein the haptic control system is configured such that one or more of the haptic control surfaces do not rotate as the ring-shaped member rotates about the central axis.

11. The ultrasonic haptic control system of claim 1, wherein the haptic control system is configured such that one or more of the haptic control surfaces rotate together with the ring-shaped member as the ring-shaped member rotates about the central axis.

12. The ultrasonic haptic control system of claim 1, wherein the ultrasound emitters are configured to move together within the ring-shaped member such that the haptic control surfaces remain stationary relative to the ring-shaped member central axis, as the ring-shaped member moves.

13. The ultrasonic haptic control system of claim 1, wherein the steering wheel is movable between a first position and a second position;
wherein the ultrasound emitters are configured to produce the haptic control surfaces when the steering wheel is positioned at or close to the first position; and
wherein the haptic control system comprises a plurality of further ultrasound emitters configured to produce the haptic control surfaces when the steering wheel is positioned at or close to the second position.

14. The ultrasonic haptic control system according to claim 6, wherein the system further comprises a holographic projector configured to produce a holographic image within or adjacent to the ring-shaped member;
wherein the holographic image provides one or more visual representations of controls of the vehicle corresponding to one or more of the haptic control surfaces; and
wherein the holographic projector is configured such that one or more of the visual representations are visible when the occupant's hand or fingers are within a threshold distance of the corresponding haptic control surface and are substantially invisible when the occupant's hand or fingers are not within the threshold distance of the corresponding haptic control surface.

15. The ultrasonic haptic control system of claim 14, wherein the haptic control surfaces are provided with corresponding visual representations according to a controls setting, and wherein the holographic projector is configured such that the visual representations remain stationary relative to the haptic control surfaces as the ring-shaped member moves.

16. The ultrasonic haptic control system of claim 14, wherein the steering wheel is movable between a first position and a second position;
wherein the holographic projector is configured to produce the visual representations when the steering wheel is positioned at or close to the first position; and
wherein the haptic control system comprises a further holographic projector configured to produce the visual representations when the steering wheel is positioned at or close to the second position.

17. The ultrasonic haptic control system of claim 14, wherein the system further comprises a controller configured to control the operation of the ultrasound emitters to provide the haptic control surfaces, and wherein the controller is further configured to control the operation of the holographic projector.

18. A method of operating a haptic control system for a motor vehicle, comprising:
providing a steering wheel comprising a ring-shaped member configured to be held by an occupant of the vehicle;
providing a plurality of ultrasound emitters associated with the steering wheel; and
focusing ultrasound waves from the ultrasound emitters to produce one or more haptic control surfaces within or adjacent to the ring-shaped member, wherein the plurality of ultrasound emitters emit ultrasound waves having a tangential component.

19. The method of claim 18 further comprising:
capturing an image of a hand or fingers of the occupant;
determining a position of the occupant's hand or fingers relative to the haptic control surfaces;
controlling the position and/or haptic qualities of the haptic control surfaces according to the position of the occupant's hand or fingers; and
determining a control input based on the position of the occupant's hand or fingers.

20. The method of any of claim 18, wherein the system further comprises a holographic projector, and wherein the method further comprises:
projecting a holographic image within or adjacent to the ring-shaped member, the holographic image configured to represent one or more controls of the vehicle; and
adjusting the holographic image to represent a further control corresponding to a haptic control surface when the occupant's hand or fingers are within a threshold distance of the haptic control surface.

* * * * *